United States Patent
Ha et al.

(10) Patent No.: US 8,069,222 B2
(45) Date of Patent: Nov. 29, 2011

(54) SYSTEM AND METHOD TO PROVIDE SERVICES BASED ON NETWORK

(75) Inventors: Tae Sin Ha, Seoul (KR); Woosup Han, Yongin-si (KR); Won Jun Ko, Yongin-si (KR); Byung Kwon Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 125 days.

(21) Appl. No.: 12/407,006

(22) Filed: Mar. 19, 2009

(65) Prior Publication Data

US 2009/0319627 A1 Dec. 24, 2009

(30) Foreign Application Priority Data

Jun. 23, 2008 (KR) .................... 10-2008-0058812

(51) Int. Cl.
*G06F 15/16* (2006.01)
(52) U.S. Cl. ......................................... 709/217; 709/218
(58) Field of Classification Search .................. 709/206, 709/217, 218
See application file for complete search history.

(56) References Cited

U.S. PATENT DOCUMENTS

| | | | |
|---|---|---|---|
| 7,546,602 B2* | 6/2009 | Hejlsberg et al. | 719/313 |
| 7,558,841 B2* | 7/2009 | Taboada et al. | 709/219 |
| 7,680,804 B2* | 3/2010 | Upendran et al. | 707/999.1 |
| 2005/0044197 A1* | 2/2005 | Lai | 709/223 |
| 2006/0155850 A1* | 7/2006 | Ma et al. | 709/226 |
| 2006/0259852 A1* | 11/2006 | Upendran et al. | 715/500.1 |
| 2007/0157167 A1* | 7/2007 | Brendle et al. | 717/120 |
| 2007/0276863 A1* | 11/2007 | Shenfield | 707/103 X |
| 2008/0097622 A1* | 4/2008 | Forney et al. | 700/1 |
| 2008/0222714 A1* | 9/2008 | Wahl | 726/9 |
| 2009/0259526 A1* | 10/2009 | Bechtel et al. | 705/10 |
| 2010/0217837 A1* | 8/2010 | Ansari et al. | 709/218 |
| 2010/0241748 A1* | 9/2010 | Ansari et al. | 709/225 |

FOREIGN PATENT DOCUMENTS

| | | |
|---|---|---|
| KR | 2005-0010487 | 1/2005 |
| KR | 2007-0037665 | 4/2007 |
| KR | 20080000759 | 1/2008 |
| KR | 2008-0019826 | 3/2008 |
| WO | 20070123785 | 11/2007 |

OTHER PUBLICATIONS

European Search Report issued Sep. 18, 2009 in EP Application No. 09155755.3.
Korean Office Action dated Jan. 5, 2010 issued in KR Application No. 2008-0058812.

* cited by examiner

Primary Examiner — Krisna Lim
(74) Attorney, Agent, or Firm — Stanzione & Kim, LLP

(57) ABSTRACT

A system to provide various content services based on a network to users includes a service provider to provide a service using the network, a user to receive the service, and a service framework to provide the service to the user through the network. The service framework includes a messenger device that manages the service transmitted between the service provider and the user. Content services, which are being provided based on a network, can be provided to various terminals including not only a PC and a mobile phone, but also a robot. Thus, extending services is easy and the user can conveniently receive desired information from a knowledge provider or website without performing repetitive operations.

15 Claims, 8 Drawing Sheets

SYSTEM AND METHOD TO PROVIDE SERVICES BASED ON NETWORK

CROSS-REFERENCE TO RELATED APPLICATIONS

This application claims priority under 35 U.S.C. §119(a) from Korean Patent Application No. 2008-0058812, filed on Jun. 23, 2008 in the Korean Intellectual Property Office, the disclosure of which is incorporated herein in its entirety by reference.

BACKGROUND OF THE INVENTION

1. Field of the Invention

The present general inventive concept relates to a system and method to provide services based on a network, and more particularly, to a system and method to provide services based on a network, wherein various content services, which are being provided based on a network, are provided to users.

2. Description of the Related Art

A messenger system that provides various content services, which are being provided based on the Web, to users through PCs or mobile phones has been developed and widely used along with the development of network technology such as the Internet.

Messenger (i.e., instant messaging) is an Internet community service that enables every user on the Internet to perform chatting, real-time message delivery, file transfer, or the like. Messenger providers incorporate various content services (for example, services providing knowledge or information regarding news, stocks, shopping, advertisements, education, games, or music) into the respective messengers in order to secure many users.

However, since messenger providers mostly design their content services such as news, stocks, shopping, advertisements, and music services on their own and provide the content services through an inclusion in messenger programs, problematically, users can receive such services only through a personal computer (PC) or mobile phone with a messenger program installed thereon. In addition, when there is a need to add a new service to a messenger or a need to change a service provided through the messenger, providers, other than the provider that has designed the messenger, cannot actively provide such various content services desired by users, thus failing to fulfill the needs of the user.

Further, when users converse about a specific issue (for example, recently released movies) through a messenger, the users mostly collect information through Internet search and then converse about the search results. To search for an issue about which the users are conversing, users have to execute a web browser and access a search website and then perform a search operation. Since the search results are displayed on the web browser, the user cannot immediately share the search results with the counterpart user. To converse with the counterpart user about the search results, the user has to copy and paste address information of a webpage providing the search results to provide the address information to the counterpart user. The counterpart user also has to perform such repetitive operations to execute a web browser and to request that the web browser to provide a webpage corresponding to the address information.

SUMMARY OF THE INVENTION

The present general inventive concept provides a system and method to provide services based on a network, wherein content services, which are being provided based on a network, can be provided to various terminals including not only a PC and a mobile phone, but also a robot.

The present general inventive concept also provides a system and method to provide services based on a network, wherein a knowledge provider or a website connected to the network can be searched for in various manners to actively provide information desired by a user to the user.

The present general inventive concept also provides a system and method to provide services based on a network to provide content services, which are being provided based on a network, to various terminals including not only a PC and a mobile phone, but also a robot. Thus, extending services is easier and a user can conveniently receive desired information from a knowledge provider or website without performing repetitive operations.

Additional aspects and/or utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a system to provide services based on a network, the system including a service provider to provide a service using a network, a user to receive the service, and a service framework to provide the service to the user through the network, wherein the service framework includes a messenger device that manages the service transmitted between the service provider and the user.

The service provider may have information of at least one user registered in the messenger device to provide the service.

The service provider may include a knowledge provider connected to the service framework through a terminal, a website connected directly to the service framework, and a service application that a service operator provides as a client.

The system may further include a user terminal having a user interface device to provide the service to the user, wherein the user terminal includes at least one of a personal computer (PC), a laptop, a mobile phone, a Personal Digital Assistant (PDA), and a robot to communicate through the network and run a messenger application.

The service framework may further include a plurality of first mapping units to convert a sensor input into a text input and a plurality of second mapping units to convert the text input into an actuator output, and the messenger device includes a plurality of messenger clients corresponding respectively to the plurality of first and second mapping units.

The plurality of messenger clients may further include a plurality of clients corresponding to the service provider and the user.

The messenger device may further include a database to store information used to provide a service to the user without connecting to the service provider.

The messenger device further includes a database that stores information used to provide a service to the user without connecting to the service provider. The database constantly learns services provided through the service framework. Thus, by learning services that the service provider provides, the database can provide even services that the database was not able to provide before the learning to the user without connecting to the service provider.

The service framework may further include an interface unit to perform independent interfacing between the website and the messenger device, and the messenger device includes a messenger client corresponding to the interface unit.

The foregoing and/or other aspects and utilities of the present general inventive concept may also be achieved by providing a method to provide services based on a network, the method including providing a service from a service provider through the network, providing the service to a user, and managing the service provided to the user through a messenger device.

Managing the service may include selecting, when the user has asked a question without specifying an answerer, an answerer for the question and forwarding an answer given by the specified answerer to the user.

Managing the service may include transferring, when the user has specified an answerer and asked a question, an answer given by the service provider corresponding to the specified answerer to the user.

Managing the service may include forwarding, when the user has specified an answerer and asked a question, the question from the service provider corresponding to the specified answerer to an answerer different from the specified answerer so that the different answerer provides an answer to the user.

Managing the service may include allowing, when the user has specified an answerer and asked a question, the service provider corresponding to the specified answerer to forward an answer given by an answerer different from the specified answerer to the user.

Managing the service may include controlling, when a terminal used to provide the service to the user is a robot, the robot so that command text issued by the service provider is transferred to the user through the robot.

Managing the service may include allowing, when a terminal used to provide the service to the user is a robot, the user to converse with the service provider through the robot.

Managing the service may include transferring, when a terminal used to provide the service to the user is a robot, information of the service provider to the user through the robot.

The foregoing and/or other aspects and utilities of the present general inventive concept may also be achieved by providing a service providing system including a service provider to provide a service through a network, and a messenger device to transmit the service through the network to a user, to manage the transmitted service, and to store information used to provide the transmitted service to the user without connecting to the service provider.

The foregoing and/or other aspects and utilities of the present general inventive concept may also be achieved by providing a method of providing a service through a network, the method including providing the service through the network, transmitting the service through the network to a user, managing the transmitted service, and storing information used to provide the transmitted service to the user without connecting to the service provider.

The foregoing and/or other aspects and utilities of the present general inventive concept may also be achieved by providing a computer-readable recording medium having embodied thereon a computer program to execute a method, wherein the method including providing a service through a network, transmitting the service through the network to a user, managing the transmitted service, and storing information used to provide the transmitted service to the user without connecting to the service provider.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
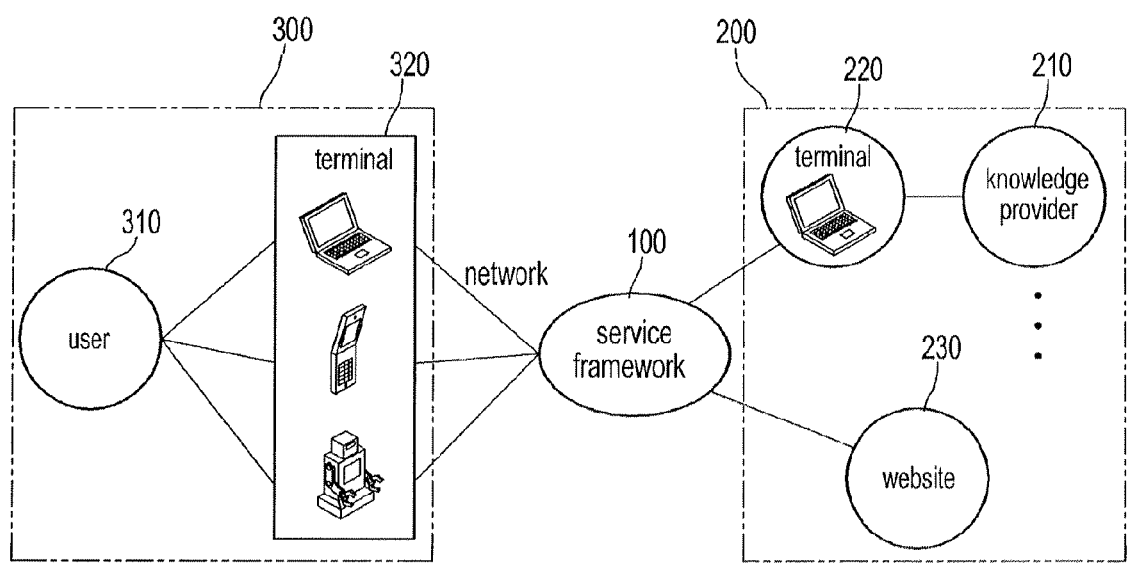
FIG. 1 illustrates a configuration of a system to provide services based on a network according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

FIG. 1 illustrates an entire configuration of a system to provide services based on a network according to an embodiment of the present general inventive concept.

As illustrated in FIG. 1, the system to provide services based on a network according to the present embodiment includes a service framework 100, a service provider 200, and a service receiver 300. The service framework 100 integrally manages a messenger system that provides services (information or knowledge) desired by a user 310. The service provider 200 provides information desired by the user 310 through the service framework 100. The service receiver 300 receives a service provided by the service provider 200 through the service framework 100. The service framework 100, the service provider 200, and the service receiver 300 are connected through a network such as an Internet Protocol (IP) network, the Internet, a mobile communication network, or a local area network (LAN) to actively provide various content services, which are being provided based on the Web, to the user 310 through various terminals 320 including not only a PC and a mobile phone but also a robot.

The service framework 100 is a module that manages services transmitted through the network between the service provider 200 and the service receiver 300 and has functions such as service control, service transmission, service security, scheduling, remote paging, user authentication, and service authority and performs operations to provide various services and manages services based on interfaces.

The service provider 200 contains information of all users registered in the messenger system in order to provide services (information or knowledge) and is connected to the service framework 100 to provide services to the service receiver 300. The service provider 200 includes a knowledge provider 210 that is connected to the service framework 100 through the terminal 220 to provide services, websites 230 (such as a search engine, a dictionary website, a blog, a database such as Knowledge IN, or Google) that are directly connected to the service framework 100 to provide services, and a service application (such as Simsimi) which a service operator provides as a client in a conventional messenger.

The service receiver 300 includes a terminal 320 having a User Interface (UI) device to provide services directly to the user 310. The user 310 receives services through the terminal 320. The user terminal 320 includes not only a general PC but also any other data processing unit (such as a laptop, a mobile phone, a Personal Digital Assistant (PDA), or a robot) that can communicate through a network and can also run a messenger application.

Figure 2:
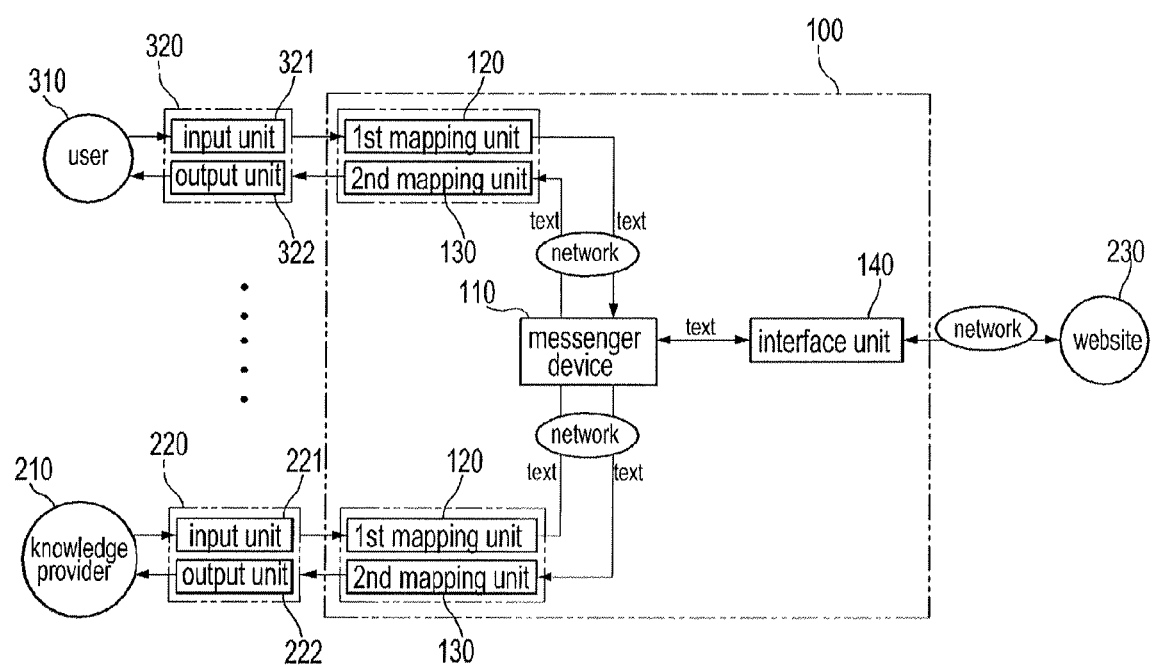
FIG. 2 is a control block diagram of the system illustrated in FIG. 1.

FIG. 2 is a control block diagram of the system illustrated in FIG. 1.

As illustrated in FIG. 2, the service framework 100 includes a messenger device 110, first mapping units (specifically, sensor-text mapping units) 120, second mapping units (specifically, text-actuator mapping units) 130, and an interface unit (specifically, messenger-Web interface) 140. Referring to FIGS. 1 and 2, the messenger device 110 allows the service provider 200 and the service receiver 300 to communicate data through the network. The first mapping units 120 perform sensor-text mapping to convert sensor inputs received respectively from the provider terminal 220 and the user terminal 320 into text outputs and transmit the text outputs to the messenger device 110. The second mapping units 130 perform text-actuator mapping to convert text inputs received through the messenger device 110 into actuator outputs and transmit the actuator outputs to the terminal 220 of the service provider 200 or to the user terminal 320 of the service receiver 300. The interface unit 140 performs independent interfacing between the messenger device 110 and the website 230 of the service provider 200.

The messenger device 110 is a system that includes a messenger server 111 and messenger clients 112 and transmits data through a network. When the messenger clients 112 are authorized by the messenger server 111 and are then connected to each other, the messenger device 110 basically supports bidirectional and broadcast text data communication between the messenger clients 112 and additionally supports binary data and multimedia stream communication.

The messenger clients 112 are modules that correspond to the service provider 200 (knowledge provider or website) and the service receiver 300 and transmit or receive messages through a messenger.

The interface unit 140 sends a text question that the user 310 has asked through the messenger client 112 to the website 230 in a manner that appears as if the user 310 provides the asked text information to the website 230 through the messenger client 112 and extracts text information in a format appropriate for the messenger client 112 from the website that has answered the question. Here, since a text format required for a webpage of the website 230 which provides the answer is different for each website 230, a dedicated interface, which has a browser function to read and analyze html documents and a function to extract information of each website, is implemented for each website 230.

The terminals 220 and 320 of the service provider 200 and the service receiver 300 include input units 221 and 321 and output units 222 and 322, respectively, and transfer sensor data corresponding to signals received through the input units (such as keyboards, mice, microphones, cameras, or various sensors) to the first mapping units 120 of the service framework 100 and output signals corresponding to actuator commands received through the second mapping units 130 of the service framework 100 through the output units (such as monitors or speakers).

The user 310 is not aware of the flow of a question asked by the user 310 in the service framework 100. In response to the question asked by the user 310, the knowledge provider 210 may access another messenger client 112 to extract and arrange information from the messenger client 112 and then may provide the information to the user 310.

Figure 3:
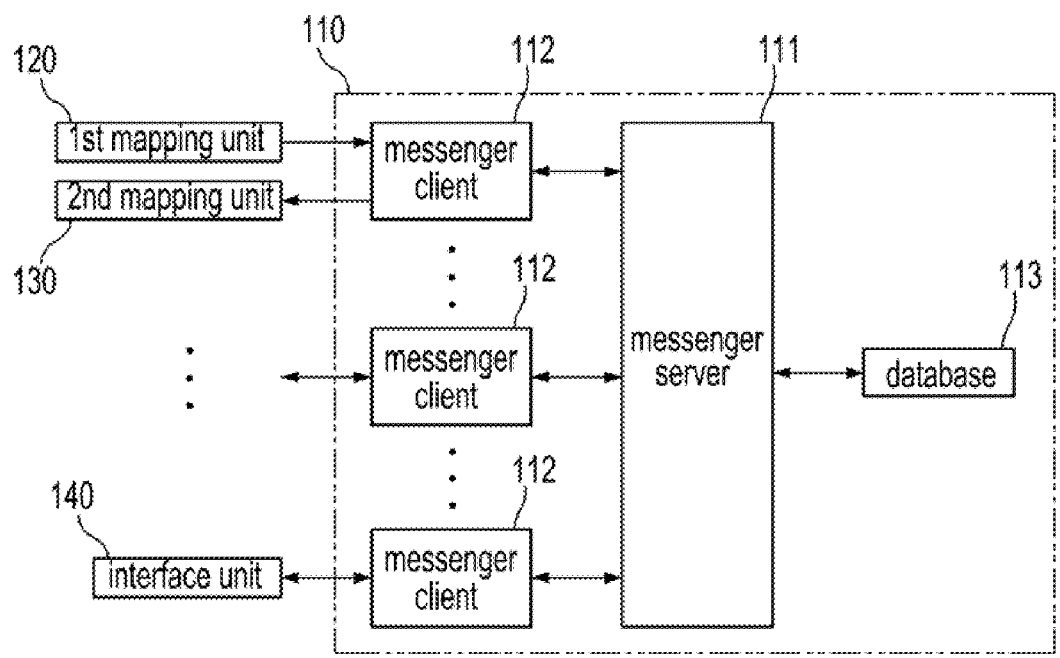
FIG. 3 is a control block diagram illustrating a messenger device according to an embodiment of the present general inventive concept.

FIG. 3 is a control block diagram illustrating a messenger device according to an embodiment of the present general inventive concept.

As illustrated in FIG. 3, the messenger device 110 includes a messenger server 111, a plurality of messenger clients 112, and a database 113. The messenger server 111 acquires information through the network and performs data transmission to provide the information to the user 310 using a messenger. The messenger clients 112 are connected via the network to the service receiver 300 or to the knowledge provider 210 through the first and second mapping units 120 and 130 and are connected via the network to the website 230 through the interface unit 140. The database 113 stores information or knowledge acquired through data communication.

The messenger server 111 may be separately constructed or may be integrated with the messenger clients 112 into a single system. When the terminal 320 of the service receiver 300 is a robot, the messenger server 111 may be separately constructed, similar to a Ubiquitous Robotic Companion (URC) server, in the case where an external server such as the URC system is present and may be integrated with the corresponding robot client and embedded in the robot in the case where no external server is present. In the case where the robot includes not only the basic messenger client 112 but also both the messenger server 111 and the database 113, the robot has not only basic intelligence but also intelligence that is extendible through a network.

The database 113 learns question or answer (text) data through one of the messenger clients 112 so as to provide information of an answer to a question asked by the user 310 without connecting to the knowledge provider 210 or the website 230 at a later time. The database 113 contains a DB table in which input data is classified and stored and includes a question/answer DB that outputs an answer mapped to the question and an answerer DB that outputs an answerer that is responsible to provide an answer to the question. Here, the designer may also write known information in the DB table.

Reference will now be made to operations of the system and method to provide messenger services based on a network described above.

Figure 4:
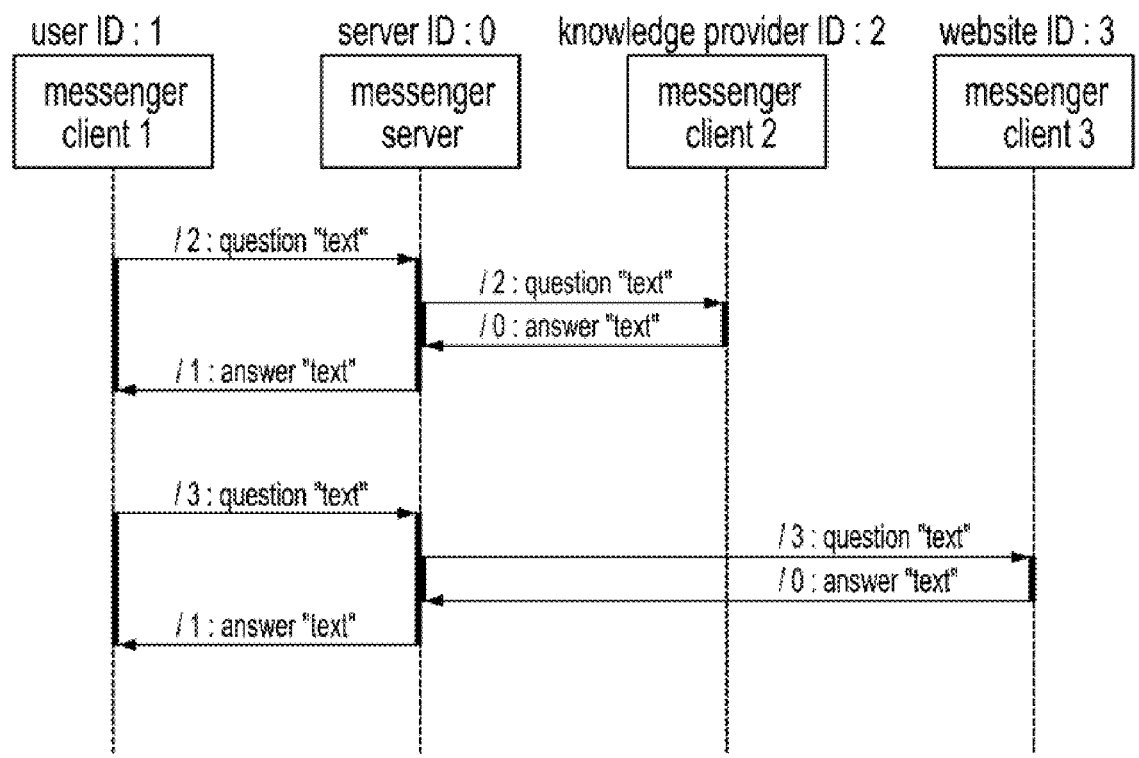
FIG. 4 is a flow chart illustrating a method to provide messenger services based on a network according to an embodiment of the present general inventive concept.

FIG. 4 is a flow chart illustrating a method to provide messenger services based on a network according to an embodiment of the present general inventive concept, wherein an answer is provided to a question asked by a user 310 when the user 310 has specified an answerer.

As illustrated in FIG. 4, one user (messenger client 1) specifies an answerer ((a messenger client 2, i.e., knowledge provider) or (a messenger client 3, i.e., website)) and asks the answerer a question and the answerer then provides an answer to the question. Specifically, FIG. 4 illustrates a set of commands issued when the user 310 asks a knowledge provider 210 a question and when the user 310 asks a website 230 a question.

Figure 5:
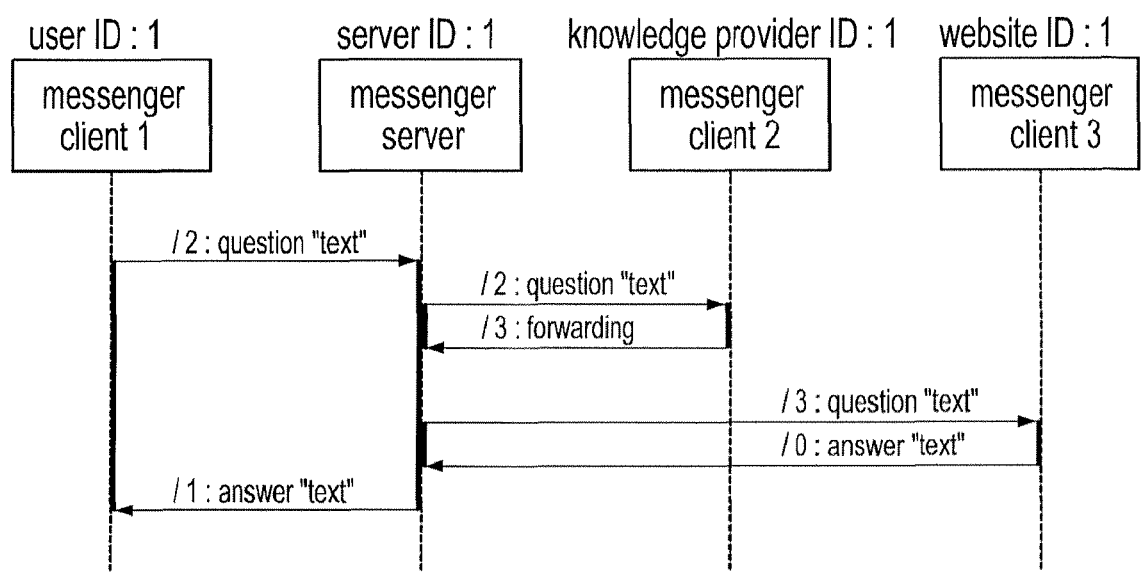
FIG. 5 is a flow chart illustrating another method to provide messenger services based on a network according to an embodiment of the present general inventive concept.

FIG. 5 is a flow chart illustrating another method to provide messenger services based on a network according to an embodiment of the present general inventive concept, wherein an answer is provided to a question asked by a user 310 when the user 310 has specified an answerer.

As illustrated in FIG. 5, one user (messenger client 1) specifies an answerer (a messenger client 2, i.e., knowledge provider) and asks the answerer a question and the answerer then forwards the question to another answerer (a messenger client 3, i.e., website) so that the answerer (messenger client 3, i.e., website) provides an answer to the user (messenger client 1). Specifically, FIG. 5 illustrates a set of commands issued when, although the user 310 has asked a knowledge provider 210 a question, the knowledge provider 210 forwards the question to a website 230 so that the website 230 provides an answer to the user 310. Here, the user 310 is not aware of the actual answerer.

Figure 6:
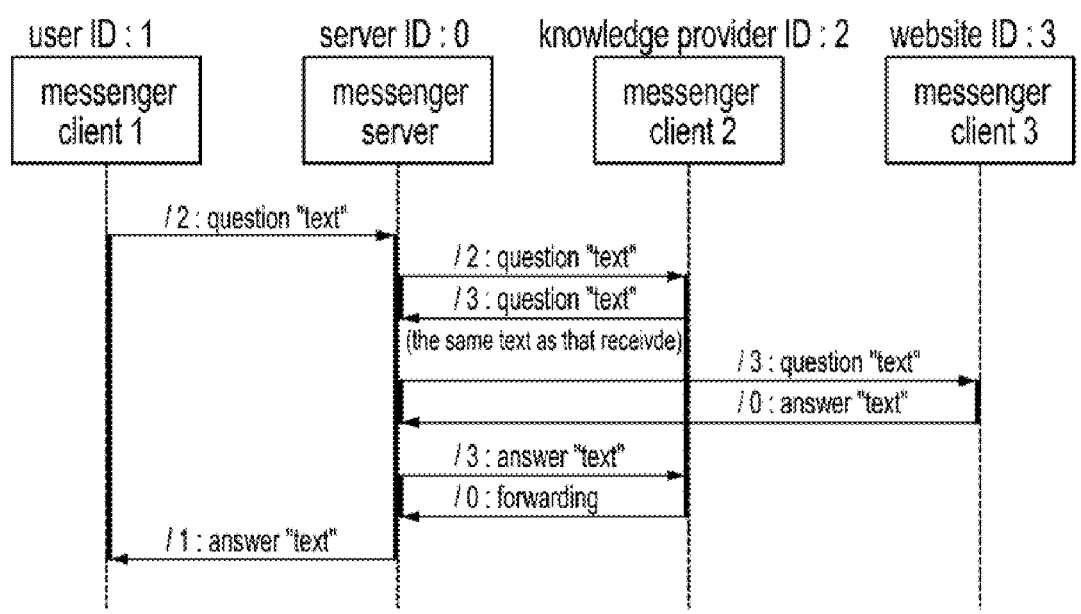
FIG. 6 is a flow chart illustrating another method to provide messenger services based on a network according to an embodiment of the present general inventive concept.

FIG. 6 is a flow chart illustrating another method to provide messenger services based on a network according to an embodiment of the present general inventive concept, wherein an answer is provided to a question asked by a user 310 when the user 310 has specified an answerer.

As illustrated in FIG. 6, one user (messenger client 1) specifies an answerer (a messenger client 2, i.e., knowledge provider) and asks the answerer a question and the answerer then asks another answerer (a messenger client 3, i.e., website) the same question. The answerer (messenger client 2, i.e., knowledge provider) then receives and checks an answer from the answerer (messenger client 3, i.e., website) and forwards the answer to the user (messenger client 1). Specifically, FIG. 6 illustrates a set of commands issued when, although the user 310 has asked a knowledge provider 210 a question, the knowledge provider 210 asks a website 230 the same question and receives and checks an answer from the website 230 and then forwards the answer to the user 310. Here, the user 310 is not aware of the actual answerer.

Figure 7:
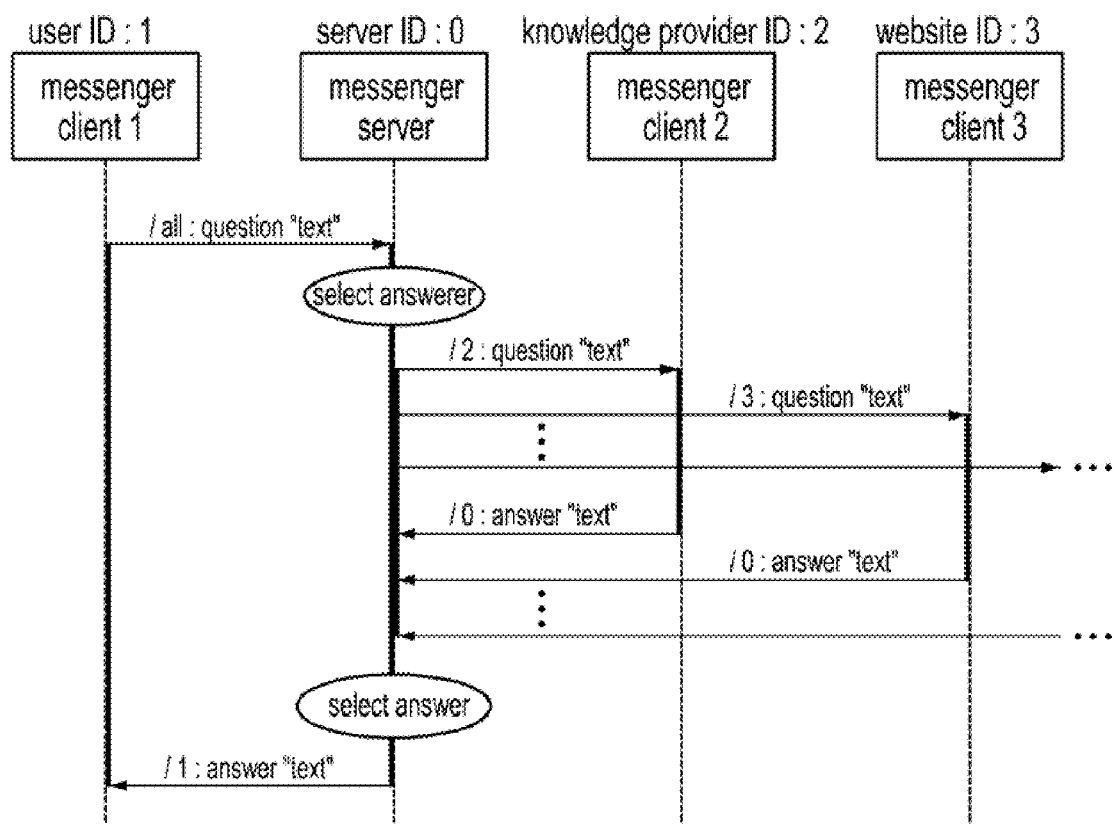
FIG. 7 is a flow chart illustrating another method to provide messenger services based on a network according to an embodiment of the present general inventive concept.

FIG. 7 is a flow chart illustrating another method to provide messenger services based on a network according to an embodiment of the present general inventive concept, wherein an answer is provided to a question asked by a user 310 when the user 310 did not specify an answerer.

As illustrated in FIG. 7, one user (messenger client 1) asks a question without specifying an answerer. In response to the question, the messenger server 111 sends the question to a number of answerers (messenger clients 2, i.e., knowledge providers) or (messenger clients 3, i.e., websites) through an answerer selection algorithm and then selects an answer from answers received from the answerers through an answer selection algorithm and provides the selected answer to the user (messenger client 1). Specifically, FIG. 7 illustrates a set of commands issued when the messenger server 111 sends a question, which the user 310 has asked without specifying an answerer, to knowledge providers 210 and websites 230 and selects an answer from answers received from the knowledge providers 210 and the websites 230 and provides the selected answer to the user 310. Here, the user 310 is not aware of the actual answerer.

The answerer selection algorithm is an algorithm that analyzes question text and selects a destination of a corresponding question. Specifically, when question text with a command target being set to "all" is received, the answerer selection algorithm analyzes the question text received through a parameter of the question and determines the question destination or determines whether or not to send the question text to all messenger clients 112 through broadcasting. When question text with a specific command target being set to a specific question destination is received, the answerer selection algorithm analyzes the question text and determines whether to add or remove the question destination.

The answer selection algorithm is an algorithm that analyzes text and selects and arranges answers. Specifically, the answer selection algorithm analyzes question text and answer text received from a number of answerers and selects answer text to be transmitted to the user 310 and converts the answer text into a format appropriate for the messenger client 112.

Reference will now be made to scenarios of processes that may be performed when a robot is used as the user terminal 320 that uses the method to provide services based on a network described above.

Figure 8:
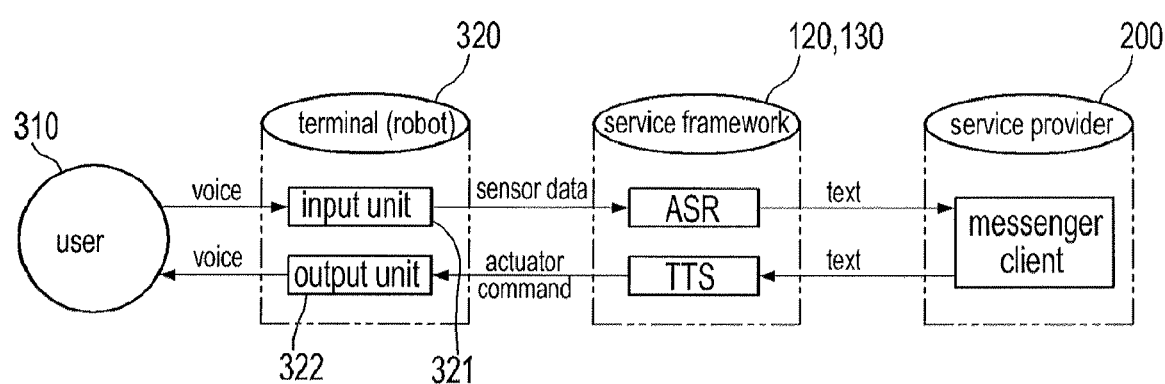
FIG. 8 illustrates an example where a robot is used as a user terminal in the system to provide services based on a network according to an embodiment of the present general inventive concept.

FIG. 8 illustrates an example where a robot is used as a user terminal in the system to provide services based on a network according to an embodiment of the present general inventive concept. The user 310 and the service provider 200 are connected to the first and second mapping units 120 and 130 of the service framework 100 through the network.

Here, the knowledge provider 210 (specifically, manager) as one service provider 200 generally connects to the first and second mapping units 120 and 130 of the service framework 100 using a PC through the network and the website 230 as another service provider 200 directly connects to the service framework 100 using the interface unit 140.

(1) A scenario wherein the knowledge provider 210 (manager) controls the robot is described below.

a. The knowledge provider 210 (manager) enters a robot control command in a text form through the messenger client 112.

b. The command text of the knowledge provider 210 is transferred to the robot terminal 320 through the first and second mapping units 120 and 130 of the service framework 100. Upon receiving the command text, the robot terminal 320 converts the command text into voice through a Text To Speech (TTS) function and provides the voice to the user 310.

(2) A scenario wherein the user 310 converses with the knowledge provider 210 through a robot is described below.

a. The user 310 vocally asks the robot a question.

b. The robot converts the question into text through Automatic Speech Recognition (ASR) and transfers the text to the knowledge provider 210 through the first and second mapping units 120 and 130 of the service framework 100. The text transferred to the knowledge provider 210 is displayed on the messenger client 112 of the knowledge provider 210.

c. The knowledge provider 210 enters an answer to the question in a text form into the messenger client 112.

d. The answer text of the knowledge provider 210 is transferred to the robot terminal 320 through the first and second mapping units 120 and 130 of the service framework 100. Upon receiving the answer text, the robot terminal 320 converts the answer text into voice through the TTS function and provides the voice to the user 310.

e. The database 113 of the service framework 100 learns such conversations (specifically, question text and answer text).

(3) A scenario wherein the user 310 converses with the knowledge provider 210 through a robot and acquires information from websites 230 (such as a dictionary website, a translation website, an integrated search website, a database such as Knowledge IN, or a blog) is described below.

a. The user 310 vocally asks the robot a question.

b. The robot converts the question into text through ASR and transfers the text to the knowledge provider 210 through the first and second mapping units 120 and 130 of the service framework 100. The text transferred to the knowledge provider 210 is displayed on the messenger client 112 of the knowledge provider 210.

c. The knowledge provider 210 asks the website 230 the same question as that received from the user 310 through the messenger client 112 and receives a text answer to the question from the website 230 and transfers the text answer to the robot terminal 320. The following is a more detailed description of this procedure.

The knowledge provider 210 transfers the question to the messenger client 112 of the website 230 through the messenger client 112.

The messenger client 112 of the website 230 moves to a preset webpage.

The messenger client 112 of the website 230 enters the received text question into a text entry on a corresponding webpage to transfer the text question to the website 230 through the interface unit 140 and awaits a response webpage.

The messenger client 112 of the website 230 extracts meaningful text from the response webpage through the interface unit 140 and transfers the extracted text to the robot terminal 320 through the first and second mapping units 120 and 130 of the service framework 100.

d. Upon receiving the extracted text, the robot terminal 320 converts the text into voice through the TTS function and provides the voice to the user 310.

e. The database 113 of the service framework 100 learns such conversations (specifically, question text and answer text).

(4) A scenario wherein the user 310 acquires information from websites 230 (such as a dictionary website, a translation website, an integrated search website, a database such as Knowledge IN, or a blog) through a robot is described below.

a. The user 310 vocally asks the robot a question.

b. The robot converts the question into text through ASR and transfers the question text to the messenger client 112 of the website 230 through the first and second mapping units 120 and 130 of the service framework 100.

c. Upon receiving the question text, the messenger client 112 of the website 230 transfers the question to the website 230 and receives a text answer to the question from the website 230 and transfers the text answer to the robot terminal 320. The following is a more detailed description of this procedure.

The messenger client 112 of the website 230 moves to a preset webpage.

The messenger client 112 of the website 230 enters the received text question into a text entry on a corresponding webpage to transfer the text question to the website 230 through the interface unit 140 and awaits a response webpage.

The messenger client 112 of the website 230 extracts meaningful text from the response webpage through the interface unit 140 and transfers the extracted text to the robot terminal 320 through the first and second mapping units 120 and 130 of the service framework 100.

d. Upon receiving the extracted text, the robot terminal 320 converts the text into voice through the TTS function and provides the voice to the user 310.

e. The database 113 of the service framework 100 learns such conversations (specifically, question text and answer text).

(5) A scenario wherein the user 310 acquires information from the database 113 of the service framework 100 is described below.

a. The user 310 vocally asks the robot a question.

b. The robot converts the question into text through ASR and transfers the question text to the database 113 through the first and second mapping units 120 and 130 of the service framework 100.

c. Upon receiving the question text, the database 113 outputs answer text and transfers the answer text to the robot terminal 320. The following is a more detailed description of this procedure.

When the database 113 is selected as a knowledge provider 210 (i.e., an answerer), the messenger server 111 accesses the database 113 to acquire answer text to the question text.

As with answer text acquired through another messenger client 112, the messenger server 111 transfers the answer text acquired from the database 113 to the robot terminal 320 through the first and second mapping units 120 and 130 of the service framework 100.

d. Upon receiving the extracted text, the robot terminal 320 converts the text into voice through the TTS function and provides the voice to the user 310.

In addition, when the robot terminal 320 can show expressions through LEDs and includes a second mapping unit (specifically, a text-actuator mapping unit) that converts text into an expression, the robot terminal 320 can convert received text not only into voice but also into a variety of expressions and can display the expressions to the user 310.

Further, when the robot terminal 320 can conduct motions including movements and includes a second mapping unit 130 (specifically, a text-actuator mapping unit) that converts text into a motion, the robot terminal 320 can convert received text not only into voice but also into a variety of motions and can display the expressions to the user 310.

Furthermore, when the robot terminal 320 includes a general input unit such as a keyboard, the robot terminal 320 can perform the scenarios as described above by converting input data that a person has entered through the keyboard into text as if converting human voice into text through ASR.

Moreover, when the robot terminal 320 includes a text recognition system, the robot terminal 320 can perform the scenarios as described above by converting an image captured by a robot camera into text, as if converting human voice into text through ASR.

Although the first mapping unit 120 that maps sensor data to messenger-based text data, the second mapping unit 130 that maps text data to an actuator command, and the messenger client 112 are provided in the service framework 100 in the above embodiment, it is apparent that the present general inventive concept is not limited to this embodiment and the same objects as those of the present general inventive concept can also be achieved when the first and second mapping units 120 and 130 and the messenger client 112 are provided in the terminal of the service provider 200 or in the service receiver 300.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As is apparent from the above description, the system and method to provide services based on a network according to various embodiments of the present general inventive concept can provide content services, which are being provided based on a network, to various terminals including not only a PC and a mobile phone, but also a robot. Thus, extending services is easy and the user can conveniently receive desired information from a knowledge provider or website without performing repetitive operations Although various embodiments of the present general inventive concept have been illustrated and described, it would be appreciated by those skilled in the art that changes may be made in these embodiments without departing from the principles and spirit of the general inventive concept, the scope of which is defined in the claims and their equivalents.

What is claimed is:

1. A system to provide services based on a network, the system comprising:
   a service provider to provide a content service using a network;
   a user to receive the content service; and
   a service framework to provide the content service to the user through the network,
   wherein the service framework includes a messenger device that includes a messenger server and messenger clients and transmits data through a network so as to manages the content service transmitted between the service provider and the user,
   wherein the messenger device includes a database to store information used to provide a service to the user without connecting to the service provider, the database learns the content service provided by the service provider through the service framework and provides the content service to the user using the learned service without connection to the service provider.

2. The system according to claim 1, wherein the content service provider includes all users registered in the messenger device to provide the service.

3. The system according to claim 1, wherein the service provider comprises:
   a knowledge provider connected to the service framework through a terminal;
   a website connected directly to the service framework; and
   a service application that a service operator provides as a client.

4. The system according to claim 1, further comprising:
   a user terminal having a user interface device to provide the content service to the user,
   wherein the user terminal includes at least one of a personal computer (PC), a laptop, a mobile phone, a Personal Digital Assistant (PDA), and a robot to communicate through the network and run a messenger application.

5. The system according to claim 1, wherein the service framework further includes a plurality of first mapping units to convert a sensor input into a text input and a plurality of second mapping units to convert the text input into an actuator output, and
   wherein the messenger device includes a plurality of messenger clients corresponding respectively to the plurality of first and second mapping units.

6. The system according to claim 5, wherein the plurality of messenger clients includes a plurality of clients corresponding to the service provider and the user.

7. The system according to claim 3, wherein the service framework further includes an interface unit to perform independent interfacing between the website and the messenger device, and
   wherein the messenger device includes a messenger client corresponding to the interface unit.

8. A method to provide services through a messenger device between a service provider and a user based on a network, the method comprising:
   receiving at the messenger device a content service from a service provider through the network;
   providing from the messenger device the content service to a user; and
   managing the messenger device the content service provided to the user
   wherein the messenger device includes a database to store information used to provide a service to the user without connecting to the service provider, the database learns the content service provided by the service provider through the service framework and provides the content service to the user using the learned service without connection to the service provider.

9. The method according to claim 8, wherein managing the content service includes selecting, when the user has asked a question without specifying an answerer, an answerer for the question and forwarding an answer given by the specified answerer to the user.

10. The method according to claim 8, wherein managing the content service includes transferring, when the user has specified an answerer and asked a question, an answer given by the service provider corresponding to the specified answerer to the user.

11. The method according to claim 8, wherein managing the content service includes controlling, when a terminal used to provide the content service to the user is a robot, the robot so that command text issued by the service provider is transferred to the user through the robot.

12. The method according to claim 8, wherein managing the content service includes allowing, when a terminal used to provide the content service to the user is a robot, the user to converse with the service provider through the robot.

13. The method according to claim 8, wherein managing the content service includes transferring, when a terminal used to provide the service to the user is a robot, information of the service provider to the user through the robot.

14. A service providing system, comprising:
   a service provider to provide a service through a network; and
   a messenger device to transmit the service through the network to a user, to manage the transmitted service, and to store information used to provide the transmitted service to the user without connecting to the service provider,
   wherein the messenger device includes a database to store information used to provide a service to the user without connecting to the service provider, the database learns the content service provided by the service provider through the service framework and provides the content service to the user using the learned service without connection to the service provider.

15. A non-transitory computer-readable recording medium having embodied thereon a computer program to execute a method, wherein the method comprises:

providing a content service through a network;

transmitting the content service through the network to a user;

managing the transmitted content service;

storing information used to learn the transmitted content service and used to provide the transmitted content service to the user without connecting to the service provider; and providing the content service to the user using the learned content service without connection to the service provider.

* * * * *